H. H. RUETER.
Improvement in Stump-Extractors.

No. 131,228.  Patented Sep. 10, 1872.

UNITED STATES PATENT OFFICE.

HERMAN H. RUETER, OF NEW HOPE, MISSOURI.

IMPROVEMENT IN STUMP-EXTRACTORS.

Specification forming part of Letters Patent No. 131,228, dated September 10, 1872.

Specification describing a new and useful Improvement in Stump-Puller, invented by HERMAN H. RUETER, of New Hope, in the county of Lincoln and State of Missouri.

Figure 1:
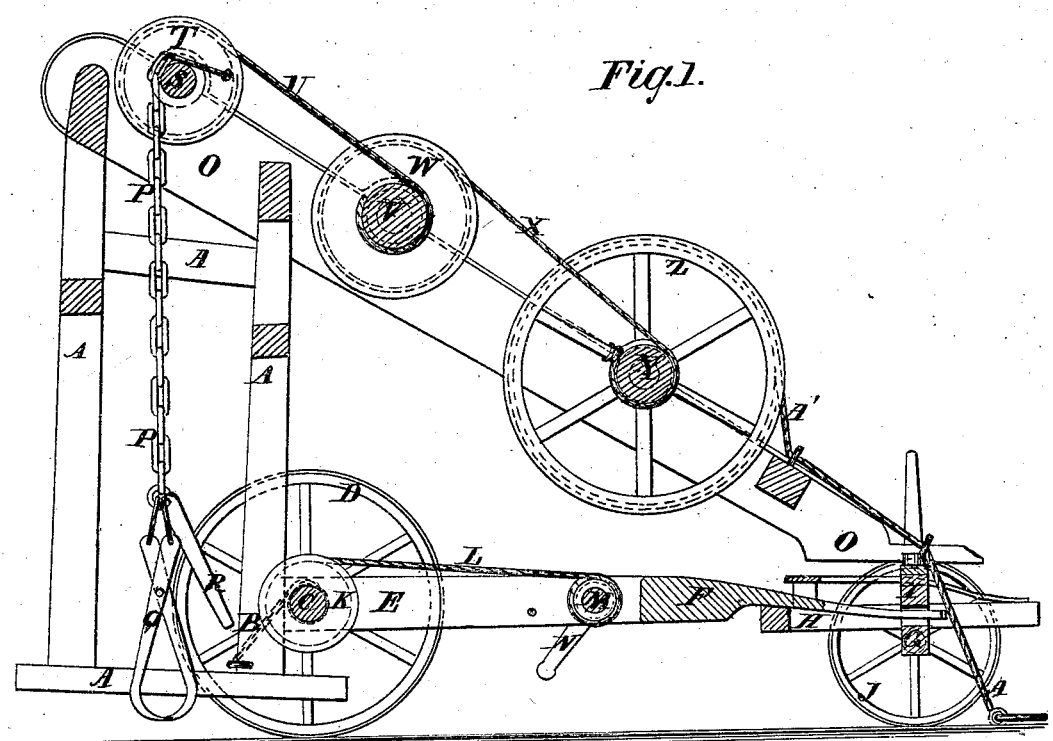
Figure 2:
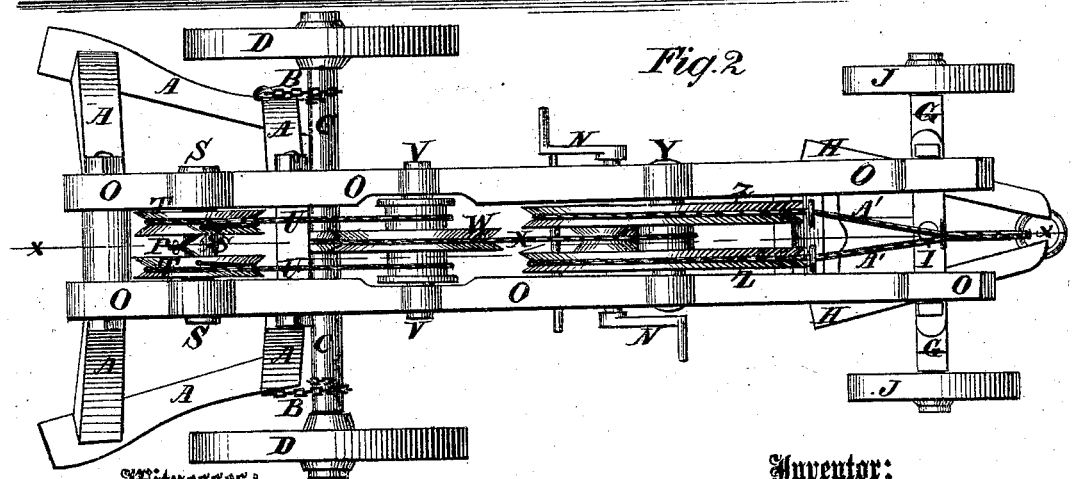

In the accompanying drawing, Figure 1 is a detail vertical longitudinal section of my improved stump-puller taken through the line $x\,x$, Fig. 2. Fig. 2 is a top view of the same.

Similar letters of reference indicate corresponding parts.

My invention has for its object to furnish an improved stump-puller, simple in construction and effective in operation, being so constructed that the stump may be drawn off by the same apparatus that pulled it; and it consists in the construction and combination of the various parts of the machine, as hereinafter more fully described.

A is the upright frame-work, the four posts of which are connected near their upper ends by cross-bars. The four posts of the frame-work A incline outward laterally as they extend downward, and the lower ends of the pair of posts upon each side are connected by a cross-bar, as shown in Figs. 1 and 2. The frame A can thus be readily backed over a stump. To the lower ends of the front posts of the frame A are attached the ends of short chains B, the other ends of which are attached to the axle C, so that by revolving the said axle C the frame A may be lowered to rest upon the ground or raised for carrying away the stump or passing from place to place. Upon the journals of the axle C revolve the rear wheels D. The axle C revolves in bearings in the rear ends of the hounds or bars E, to and between the forward ends of which is secured the reach F, the bars or hounds E serving as the rear part of the reach. The forward end of the reach F rests upon the forward axle G, where it is secured by the king-bolt. The forward axle G, forward hounds H, forward bolster I, and forward wheels J may be the forward part of the running-gear of an ordinary wagon, or they may be built expressly for the machine. To the center of the axle C is attached a drum or grooved pulley, K, to which is attached one end of a rope or chain, L, the other end of which is attached to the shaft M, which revolves in bearings in the forward parts of the bars or hounds E, and to one or both ends of which is attached a crank, N, by which the said shaft is turned. The shaft M may be held in any position into which it may be turned by pawls and ratchet-wheels connected with it, or by pins for the cranks to strike against, or in any other convenient manner. By this construction, by turning the crank N in one direction, the chains B will be wound upon the axle C, raising the frame A and anything that may be attached to it away from the ground. O are two parallel bars securely connected to each other by cross-bars. The forward ends of the bars O rest upon the forward bolster I, and their rear ends are attached to the upper end of the frame A. P is a large chain, to the lower end of which are attached the grabbers Q, chains, or other device, by which the stump to be pulled is secured to said chain. R is a brace or prop, one end of which is secured to the lower end of the chain P, or to the grabbers or chain Q, and its other end is designed to be placed against the side of the stump so as to tip or turn the stump as it is drawn from the ground. The other end of the chain P is secured to the short shaft S, the journals of which revolve in bearings in the upper or rear parts of the bars O. To the shaft S, at the inner sides of the bars O, are attached two grooved pulleys, T, to which are attached the ends of the two chains or ropes U, the other ends of which are attached to the shaft V at the inner sides of the bars O. The shaft V revolves in bearings attached to the bars O at a little distance from the shaft S, and to its center is attached a grooved pulley, W, to which is attached the end of the rope or chain X, the other end of which is attached to the middle part of the short shaft Y, which revolves in bearings attached to the bars O at a little distance from the shaft V, and to which, at the inner sides of the bars O are attached large grooved pulleys Z. To the pulleys Z are attached the ends of the ropes or chains A', which pass around guide pulleys B' attached to the cross-bar of the bars O. The forward ends of the ropes or chains A' are brought together, and to them is attached the power.

By this construction the advantage of leverage is so great that a small force applied to the ropes or chains A' will exert a great power at the chain P. By this construction also, when the power is applied, the tendency will be to raise the forward end of the bars O from the bolster I, so that the entire strain will come upon the frame A, thus relieving the carriage from having to sustain said strain.

Having thus described my invention, I claim as new and desire to secure by Letters Patent—

1. The frame-work A O, constructed and arranged, substantially as herein shown and described, to adapt it to receive the operating mechanism of a stump-puller, substantially as set forth.

2. The chains B, revolving axle C, pulley K, rope or chain L, and crank-shaft N M, constructed and arranged in connection with the wheels D, hounds or bars E, reach F, and the forward part of the running-gear of a wagon to adapt it to receive and carry the frame-work A O of the stump-puller, substantially as herein shown and described.

3. The arrangement of the chain P, shaft S, pulleys T, ropes or chains U, shaft V, pulley W, rope or chain X, shaft Y, pulleys Z, and ropes or chains A', in connection with each other and with the frame-work A O, substantially as herein shown and described.

HERMAN H. RUETER.

Witnesses:
CHARLTON ROACH,
AUGUST SAUER.